(12) United States Patent
Black

(10) Patent No.: US 7,946,830 B2
(45) Date of Patent: May 24, 2011

(54) TRANSFER CASE PUMP BRACKET

(75) Inventor: Michael T. Black, Caledonia, MI (US)

(73) Assignee: Adapt-A-Case, Inc., Grand Rapids, MI (US)

( * ) Notice: Subject to any disclaimer, the term of this patent is extended or adjusted under 35 U.S.C. 154(b) by 0 days.

(21) Appl. No.: 12/796,150

(22) Filed: Jun. 8, 2010

(65) Prior Publication Data
US 2010/0242670 A1 Sep. 30, 2010

Related U.S. Application Data

(63) Continuation of application No. 11/524,821, filed on Sep. 21, 2006, now Pat. No. 7,740,458.

(60) Provisional application No. 60/811,955, filed on Jun. 8, 2006.

(51) Int. Cl.
*F04B 35/01* (2006.01)
(52) U.S. Cl. ...................................................... 417/360
(58) Field of Classification Search .................. 417/363; 184/6.27, 11.3, 6.13, 6.28, 26, 27.1; 74/606 R, 74/665 F, 665 G; 411/521
See application file for complete search history.

(56) References Cited

U.S. PATENT DOCUMENTS

| 5,207,463 | A | * | 5/1993 | Seizert et al. | 292/256.6 |
|---|---|---|---|---|---|
| 5,913,523 | A | * | 6/1999 | Selapack | 277/632 |
| 6,592,348 | B1 | | 7/2003 | Johnson | |
| 7,495,575 | B2 | | 2/2009 | Tomzik et al. | |
| 7,740,458 | B2 | * | 6/2010 | Black | 417/360 |

* cited by examiner

*Primary Examiner* — Devon C Kramer
*Assistant Examiner* — Bryan Lettman
(74) *Attorney, Agent, or Firm* — Van Dyke, Gardner, Linn & Burkhart, LLP

(57) ABSTRACT

A bracket for use with a fluid pump in a transfer case of a vehicle comprises a base member and a plurality of support members extending outwardly from the outer periphery of the base member, with each support member comprising at least one wall member. The base member is positioned within a fluid pump cavity of a transfer case housing when installed into the transfer case, where the fluid pump cavity includes a plurality of indent portions for receiving lugs extending from the fluid pump. Each support member is disposed within a separate indent portion with a wall member being positioned between the transfer case housing and a portion of a fluid pump lug received within the respective indent portion such that the wall members at least partially inhibit the respective lug portions from contacting the transfer case housing proximate the indent portions of the fluid pump cavity.

16 Claims, 5 Drawing Sheets

TRANSFER CASE PUMP BRACKET

CLAIM OF PRIORITY

The present application is a continuation of U.S. application Ser. No. 11/524,821, filed Sep. 21, 2006, now U.S. Pat. No. 7,740,458 issued Jun. 22, 2010, which claims priority of U.S. provisional application Ser. No. 60/811,955, filed Jun. 8, 2006, by Michael T. Black for TRANSFER CASE PUMP BRACKET, which are both hereby incorporated herein by reference in their entireties.

BACKGROUND OF THE INVENTION

The present invention is directed to a bracket for use with a fluid pump in a transfer case of a vehicle.

Transfer cases are integral components of the drive train of four wheel drive and all wheel drive vehicles. Power from the transmission is delivered to the transfer case, which in turn transmits power to both the front and rear axles. Transfer cases include an outer housing, such as a cast housing, and numerous internal parts, such as moving parts like gears that require lubrication. Lubrication of the internal components is accomplished by way of an internal fluid pump that draws in and pumps out fluid from the sealed transfer case.

In the case of a General Motors model 246GM transfer case, for example, the fluid pump is positioned within an internal cavity formed in the cast housing and is driven by a rotating shaft. Although the pump is constrained within the cast housing of the transfer case, rotation of the shaft causes slight movement of the fluid pump relative to the cast housing. This relative movement causes wear to the cast housing and, due to its relatively thin and softer walls, can frequently result in one or more holes or openings being undesirably formed in the cast housing. Such holes result in the internal lubrication fluid leaking from the transfer case, which in turn can result in severe damage to the internal components of the transfer case.

Therefore, there is a need in the art for a means to prevent the formation of holes in the transfer case housing caused by wear from relative movement of the fluid pump.

SUMMARY OF THE INVENTION

The present invention provides a bracket for use in a transfer case. The bracket is positionable adjacent or between portions of the transfer case fluid pump and the transfer case housing to inhibit wearing of the housing from relative movement of the fluid pump caused by an output shaft that drives the fluid pump. According to an aspect of the present invention, a bracket for use with a fluid pump that is at least partially received within a pump cavity of a transfer case comprises a base member and at least one support member extending from the base member. The base member is adapted to being positioned between the fluid pump and the transfer case when the fluid pump is assembled to the transfer case. The at least one support member is receivable within an indent portion of the pump cavity and is adapted to at least partially inhibit the fluid pump from contacting the transfer case proximate the indent portion of the pump cavity.

According to another aspect of the present invention, a bracket for use with a fluid pump that is at least partially received within a pump cavity of a transfer case comprises a base member and four support members extending from the base member. The base member is generally ring shaped and includes a generally circular outer perimeter and is adapted to being positioned between the fluid pump and the transfer case when the fluid pump is assembled to the transfer case. The support members each include a tab member and a wall member, with the wall members being oriented generally perpendicular relative to the tab members. Each support member is adapted to be received within an indent portion of the pump cavity with the support members being adapted to at least partially inhibit lug portions of the fluid pump from contacting the transfer case proximate the indent portions of the pump cavity.

According to another aspect of the present invention, a bracket for use with a fluid pump that is at least partially received within a pump cavity of a transfer case comprises a base member and at least one support member integrally formed with the base member. The base member is adapted to be positioned between at least a portion of the fluid pump and the transfer case when the fluid pump is assembled to the transfer case. The at least one support member is receivable within an indent portion of the pump cavity and is adapted to at least partially inhibit the fluid pump from contacting the transfer case proximate the indent portion of the pump cavity.

The bracket of the present invention is adapted for installation into the pump cavity of a transfer case housing such that the bracket is positioned adjacent or between the housing and a fluid pump used to lubricate internal components of the transfer case. Support members on the bracket are positionable within indent portions of the pump cavity and are adapted to receive or engage projections or lugs on the fluid pump when the fluid pump is positioned into the pump cavity. When so positioned, the fluid pump lugs of the fluid pump are inhibited by the bracket support members from contacting the housing. The bracket thereby inhibits wear of the transfer case housing that may otherwise occur due to relative movement of the fluid pump against the housing caused by an output shaft of the transfer case that drives the fluid pump. Further, the bracket aids in preventing holes from being formed in the housing that would enable the lubrication fluid within the transfer case to leak out and result in damage to the internal components of the transfer case.

These and other objects, advantages, purposes and features of this invention will become apparent upon review of the following specification in conjunction with the drawings.

DESCRIPTION OF THE PREFERRED EMBODIMENTS

Figure 1:
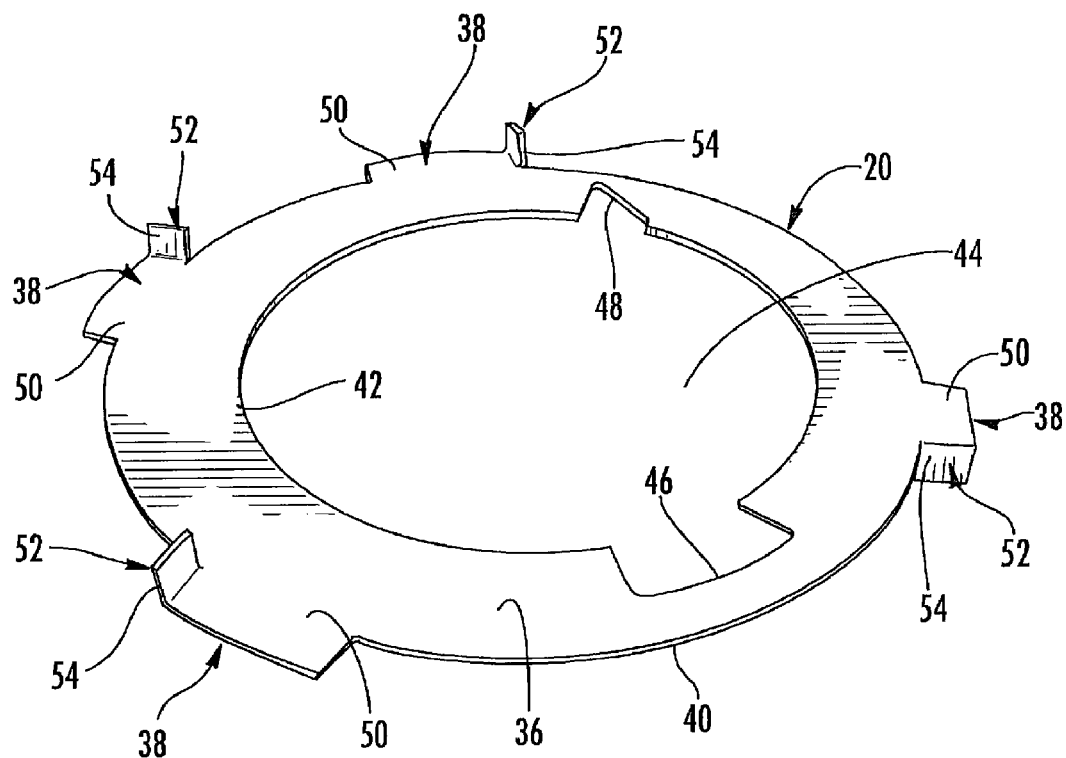
FIG. 1 is a perspective view of a bracket in accordance with the present invention.
Figure 2:
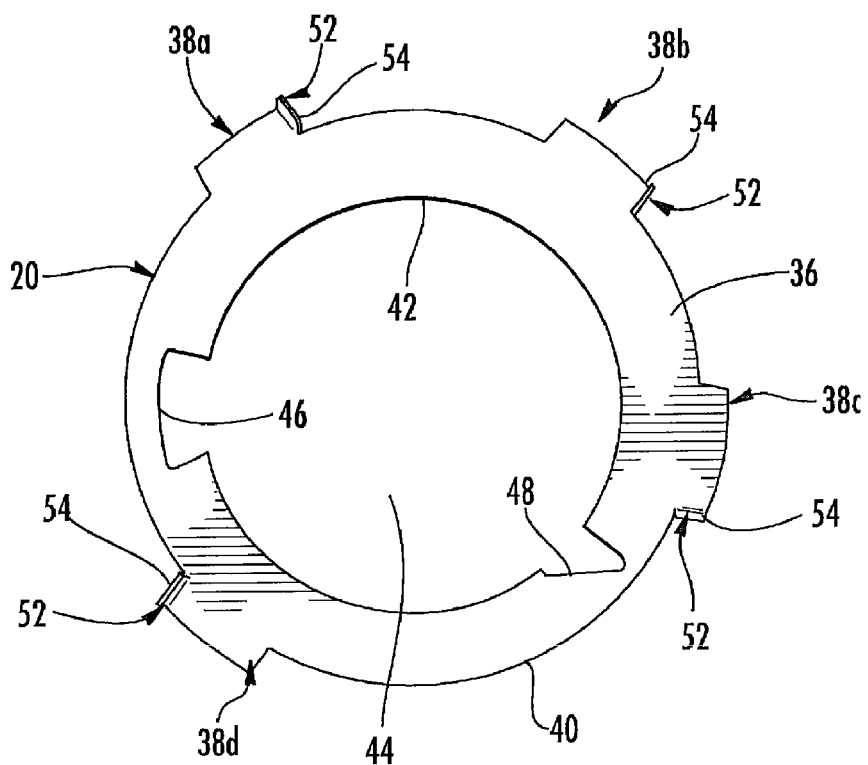
FIG. 2 is a top plan view of the bracket of FIG. 1.
Figure 3:
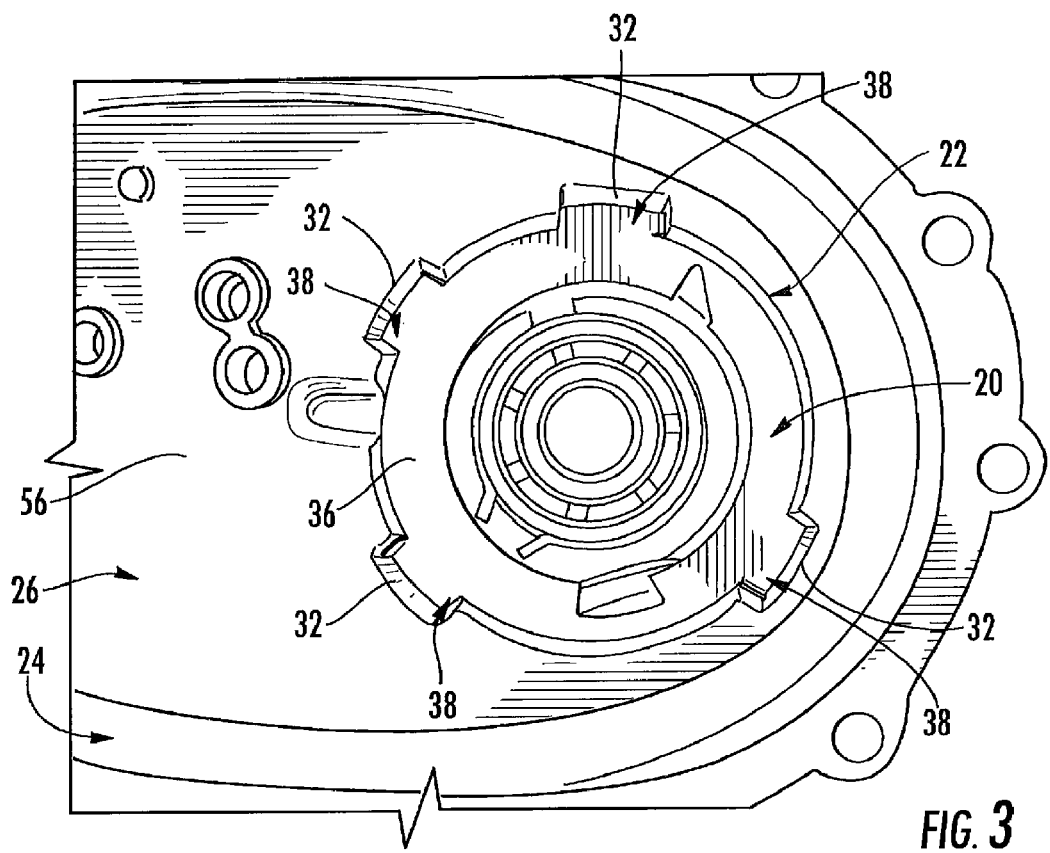
FIG. 3 is a top perspective view of the bracket of FIG. 1 shown positioned within the pump cavity of a housing of a transfer case.
Figure 4:
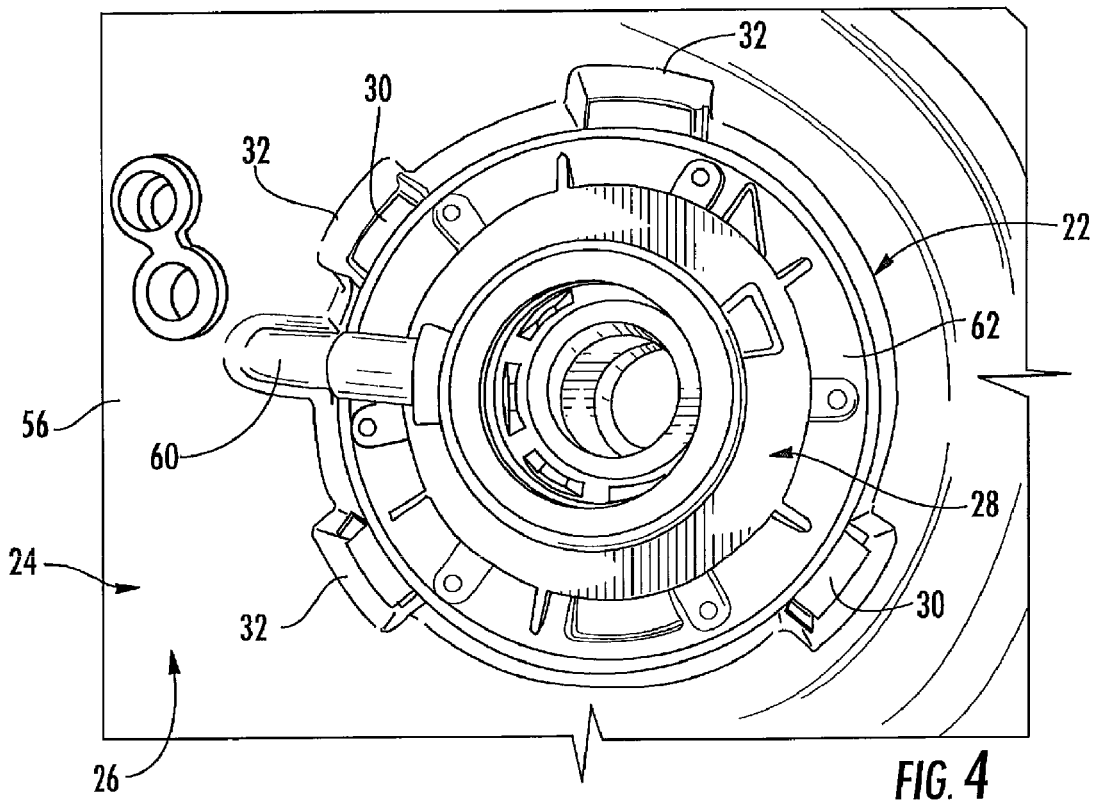
FIG. 4 is a top perspective view of a fluid pump positioned in the pump cavity and received by the bracket of FIG. 3.

The present invention will now be described with reference to the accompanying figures, wherein the numbered elements in the following written description correspond to like-numbered elements in the figures. A bracket 20 is illustrated in FIGS. 1 and 2 that, as shown in FIG. 3, is adapted for installation into a pump cavity 22 of a housing or housing portion 24 of a transfer case 26 such that the bracket 20 may be disposed between the housing 24 and a fluid pump 28 when the fluid pump 28 is installed to the transfer case housing 24 as illustrated in FIG. 4.

Figure 7:
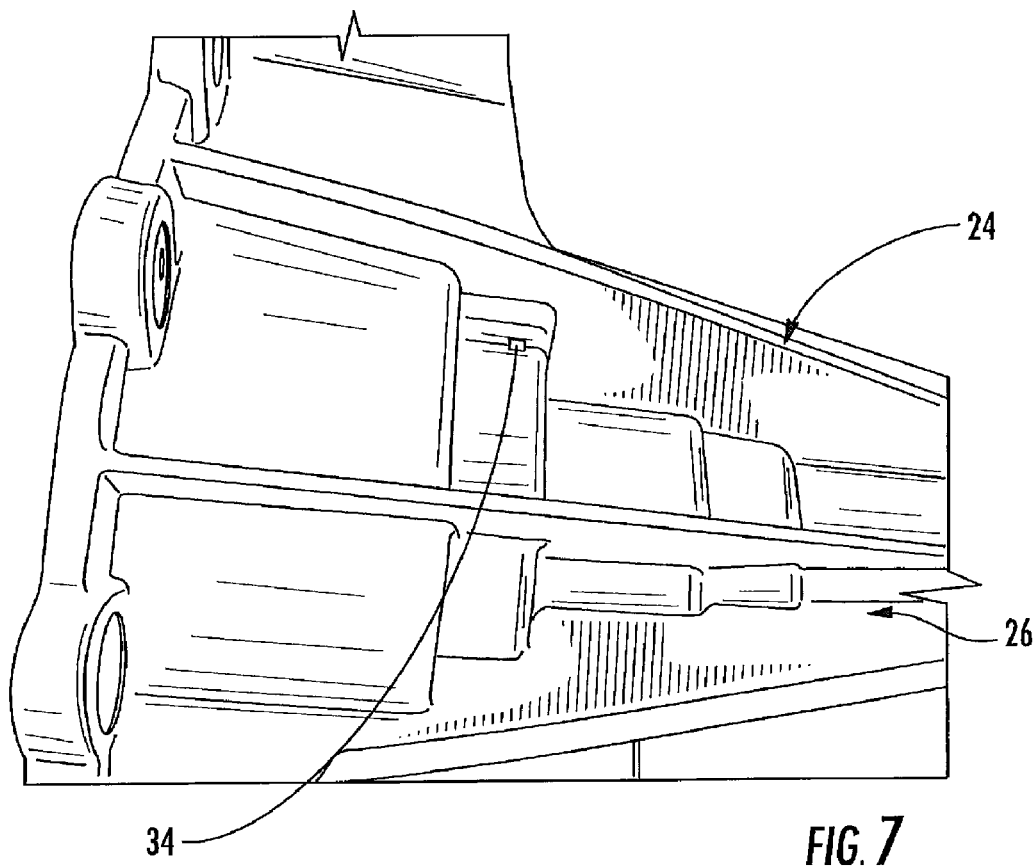
FIG. 7 is a side perspective view of the exterior portion of the transfer case housing of FIG. 6 illustrating the exterior area of the pump cavity of FIGS. 4 and 5.

A shaft or output shaft or drive shaft (not shown), which rotates to provide driving motion to the vehicle, is engagingly connected to fluid pump 28 to rotate or drive fluid pump 28 such that internal lubricating fluid (not shown) may be drawn into and pumped out of the fluid pump 28. Fluid pump 28 is inhibited or constrained from rotating within pump cavity 22 by projections or lugs 30 on fluid pump 28 interacting with indent portions or sockets 32 of pump cavity 22. Without bracket 20, however, lugs 30 of fluid pump 28 are caused to contact housing 24 adjacent indent portions 32 in response to rotation of the output shaft. The repeated contacting of lugs 30 against housing 24, causes wear which may result in the formation of holes 34 (FIG. 7) in housing 24.

As described in more detail below, bracket 20 is constructed to substantially inhibit the fluid pump 28 from contacting the housing 24 adjacent indent portions 32 to inhibit wear caused by relative movement of the fluid pump 28 against the housing 24. Bracket 20, therefore, aids in preventing holes from being formed in the housing 24 that would allow the lubrication fluid within the transfer case 26 to leak out and, subsequently, result in damage to the internal components of the transfer case 26.

Referring again to FIGS. 1 and 2, the illustrated bracket 20 is constructed to have a generally ring-shaped configuration and includes a base member 36 and four support members 38 that extend generally radially outwardly from a generally circular outer periphery 40 of base member 36. The base member 36 also includes a generally circular inner periphery 42, which defines an opening or hole 44 in base member 36. Opening 44, as described in more detail below, enables an output shaft (not shown) to engage and drive fluid pump 28. As disclosed in FIG. 2, outer periphery 40 and inner periphery 42 may form slightly non-concentric circles. Base member 36 also includes cutouts 46, 48 with cutouts 46, 48 being located and sized to align and match to similarly shaped cutouts located on fluid pump 28, as described in more detail below.

Each support member 38 includes a tab member 50 and a bumper member 52 formed as a wall member 54. Tab members 50 are substantially coplanar with base member 36, with wall members 54 being oriented generally perpendicular to tab members 50 and defining planes that are approximately radially aligned with base member 36. As disclosed in FIG. 2, support members 38 are asymmetrically disposed about outer periphery 40. Specifically, support members 38a and 38b are separated by approximately 75 degrees about an arc defined by outer periphery 40, support members 38b and 38c are separated by approximately 60 degrees, support members 38c and 38d are separated by approximately 120 degrees, and support members 38d and 38a are separated by approximately 105 degrees.

In the illustrated embodiment, bracket 20 is constructed from 0.036 inch thick sheet metal that is laser cut, with wall members 54 being subsequently deformed or bent into the orientation noted above. Bracket 20 may then be plated or anodized, or the like, to inhibit corrosion. It should be appreciated however, that bracket 20 may alternatively be stamped or constructed from alternative materials, such as stainless steel or aluminum, for example. An alternative bracket may even be formed of a molded or machined plastic or polymeric material.

Figure 5:
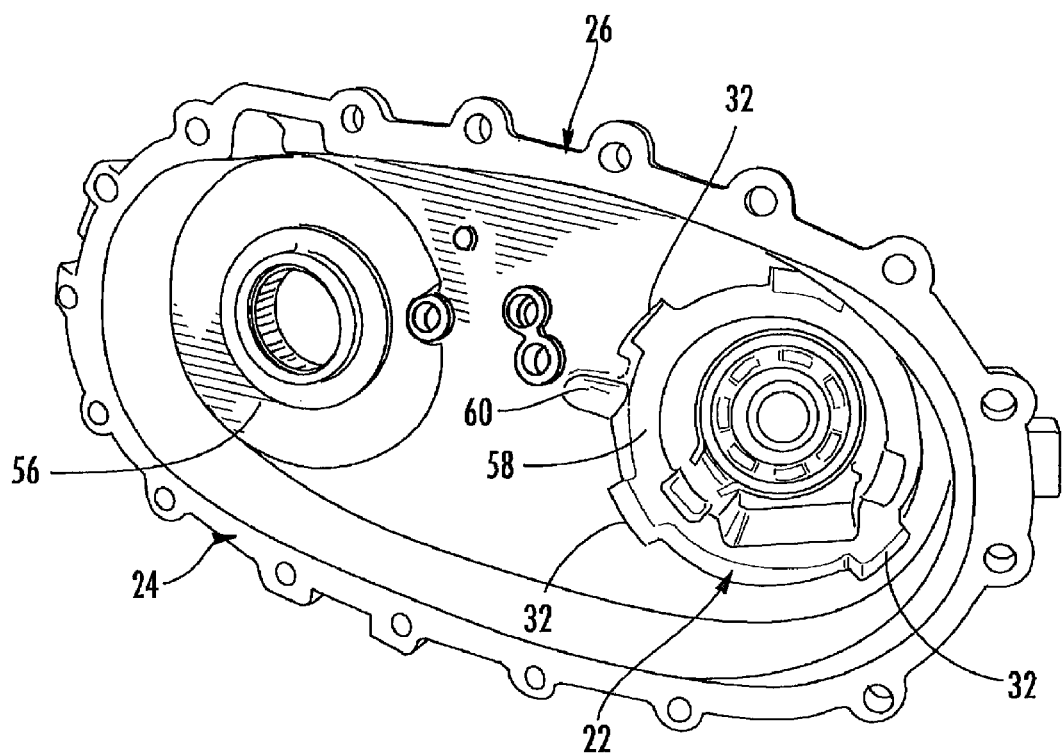
FIG. 5 is an interior perspective view of a transfer case housing disclosing the pump cavity without the bracket of FIG. 1.
Figure 6:
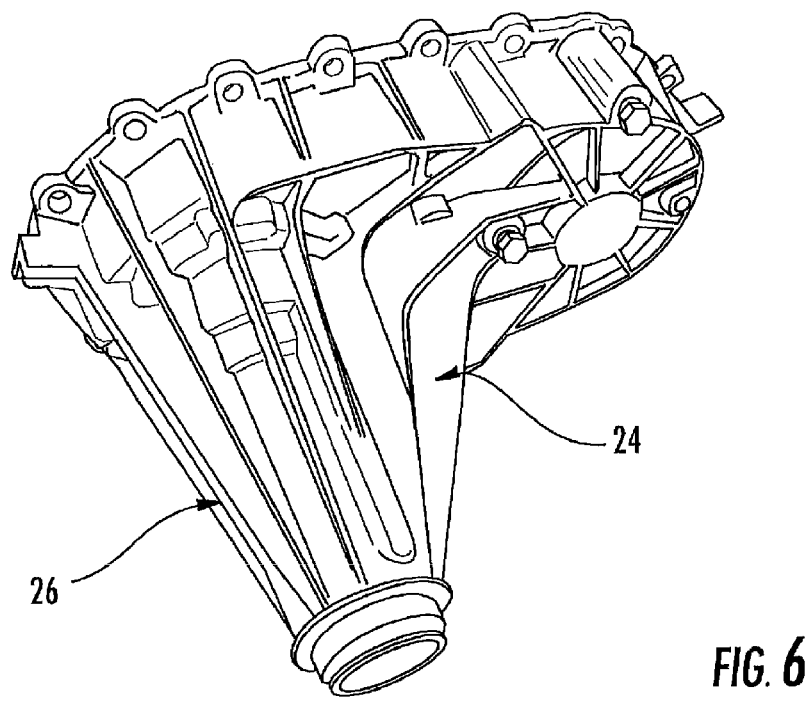
FIG. 6 is an exterior perspective view of the transfer case housing of FIG. 5.

As previously noted, bracket 20 is adapted for positioning within the pump cavity 22 of a transfer case 26. Referring now to FIGS. 5 and 6, a model 246GM transfer case produced by or for the General Motors Corporation of Detroit, Mich. is partially illustrated. Transfer case 26 includes housing 24 having an internal region 56 for retaining internal components, such as gears and lubricating fluid (not shown), and is formed from a cast magnesium material.

Pump cavity 22 forms a generally circular receptacle within internal region 56 and includes four sockets or indent portions 32 for restraining motion of fluid pump 28, as described below. Indent portions 32 are asymmetrically positioned about pump cavity 22 in similar manner to the positioning of support members 38 about outer periphery 40 of bracket 20, as described above. A ledge or shelf 58 is located within pump cavity 22 for supporting a portion of fluid pump 28 when assembled to transfer case 26. Extending from pump cavity 22 is a channel or passage 60 enabling a fluid inlet tube (not shown) to be connected to the fluid pump 28.

Figure 8:
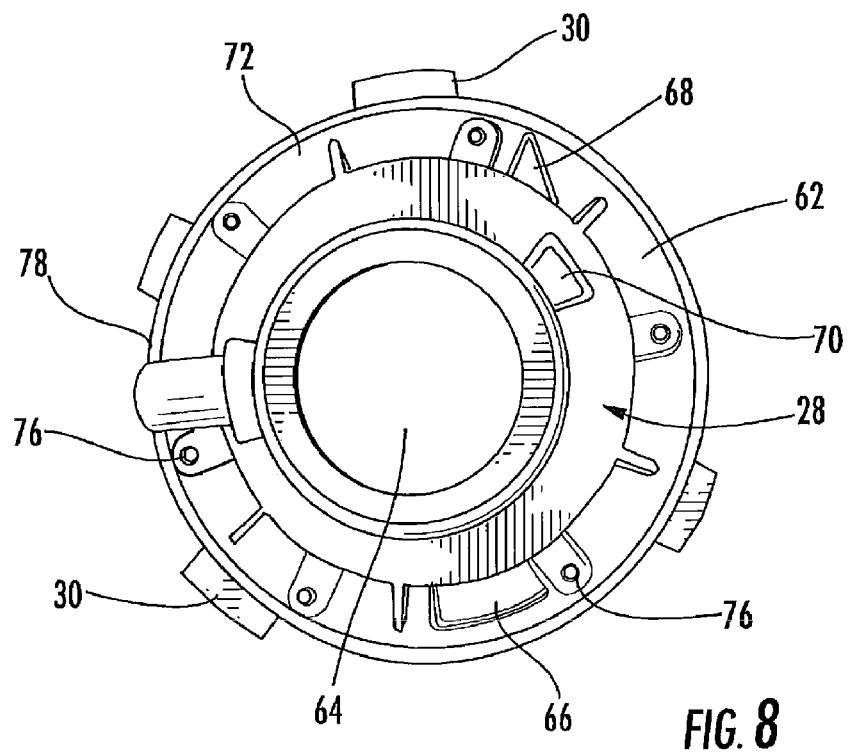
FIG. 8 is a top perspective view of a transfer case fluid pump removed from the transfer case.
Figure 9:
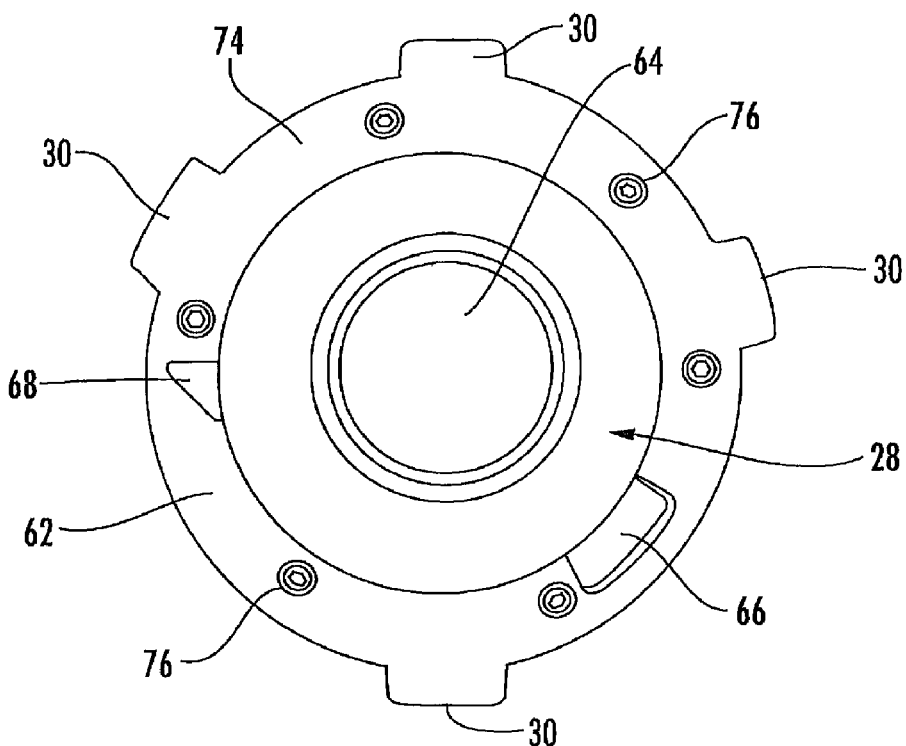
FIG. 9 is an opposite side plan view of the fluid pump of FIG. 8.

Referring now to FIGS. 8 and 9, fluid pump 28 is also generally circular and is designed to be installed within pump cavity 22, as shown in FIG. 3. Fluid pump 28 includes four lugs or projections 30 extending generally radially outwardly from a flange portion 62 of the fluid pump 28. Lugs 30 are asymmetrically positioned about fluid pump 28 in similar manner to the positioning of support members 38 about outer periphery 40 of bracket 20, as described above. A central drive hole 64 is adapted to receive an output shaft for driving fluid pump 28. In addition, fluid pump 28 also includes several apertures or cutouts 66, 68, 70, two of the cutouts 66, 68 being located on flange 62 that may enable lubricating fluid to flow there through. Fluid pump 28 also includes a first plate 72 (FIG. 8) and a second plate 74 (FIG. 9) that are held together and retain the internal components (not shown) of fluid pump 28 by fasteners 76. An inlet nozzle 78 (FIG. 8) is adapted to align with channel 60 of housing 24 such that an inlet tube may be affixed to nozzle 78 for drawing lubricating fluid from a low spot or pooling location or reservoir (not shown) within the transfer case 26.

Referring again to FIG. 3, bracket 20 is adapted to be positioned within pump cavity 22 with base member 36 located on ledge 58 and support members 38 positioned within indent portions 32. Due to the asymmetrical orientation of support members 38 and indent portions 32, bracket 20 may only be positioned within pump cavity 22 in the proper orientation. When bracket 20 is so positioned, tab members 50 are disposed on the portion of ledge 58 extending into indent portions 32 and wall members 54 extend generally perpendicularly from the surface of ledge 58 and are positioned adjacent a sidewall of indent portion 32.

Fluid pump 28 may then be installed to pump cavity 22 such that bracket 20 is positioned between fluid pump 28 and housing 24. As discussed above, lugs 30 of fluid pump 28 are adapted to align with indent portions 32 when fluid pump 28 is installed within pump cavity 22. Due to the asymmetrical orientation of lugs 30 and indent portions 32, fluid pump 28 may also only be positioned within pump cavity 22 in the proper orientation. FIG. 4 illustrates that cutouts 66, 68 of fluid pump 28 align with cutouts 46, 48 of bracket 20, respectively, such that, for example, lubricating fluid may flow there through. Although not shown, fluid pump 28 is retained in position within pump cavity 22 by further assembling the remaining un-illustrated components of transfer case 26, with the components generally stacking together to retain fluid pump 28 in position.

When fluid pump 28 is positioned within pump cavity 22 in the above described manner, lugs 30 are positioned on or received by tab members 50 and partially surrounded by wall members 54. Notably, in the illustrated embodiment, wall members 54 are provided only on one edge or side of tab members 50 such that support members 38 generally form an L-shape with wall members 54 positioned only about one end or side of lugs 30. Because the output shaft predominantly or only turns in one direction, which is clockwise in the view shown in FIG. 4, fluid pump 28 is mainly or only biased in that direction. Wall members 54, therefore, are positioned to inhibit the lugs 30 from contacting housing caused by this one way or predominant directional movement of fluid pump 28. It should be appreciated, however, that an alternative bracket may have support members with two bumper members or wall members located distally from each other on a tab member to form a generally C-shaped support member adapted to surround both sides or ends of lugs, as well as extend between the lugs and the portion of ledge located in indent portions.

With lugs 30 positioned on tab members 50 and partially surrounded by wall members 54 within indent portions 32 as described above, the lugs 30 are generally inhibited from contacting housing 24. Bracket 20 is thus able to limit or inhibit wear of housing 24 caused by the relative motion of fluid pump 28 resulting from rotation of the output shaft. Bracket 20 advantageously inhibits such wear by, in addition to inhibiting lugs 30 from contacting housing 24, occupying additional space within indent portions 32 to limit the amount of possible movement by a lug 30 within an indent portion 32. In addition, in the illustrated embodiment, the intersection of wall members 54 to tab members 50 is radiused, thereby substantially avoiding sharp edges or corners that might otherwise be driven into or against housing 24 to create higher contact stresses. Furthermore, as illustrated in FIG. 4, wall members 54 define a larger contact area against housing 24 as compared to the sides or ends of lugs 30 such that bracket 20 decreases the contact stress against housing 24, thereby further inhibiting wear.

Figure 10:
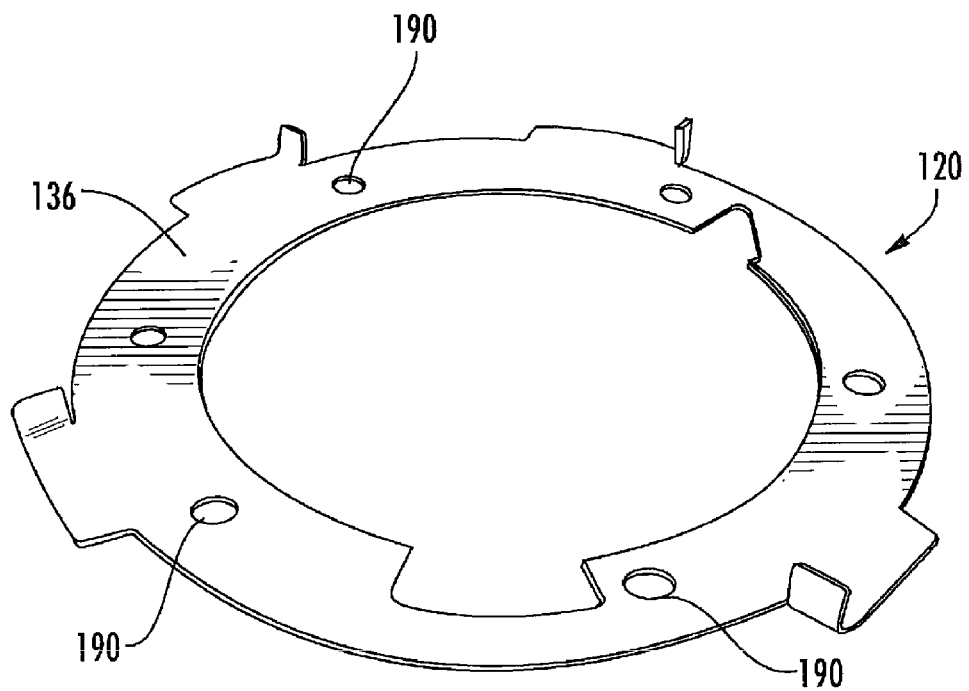
FIG. 10 is a perspective view of another bracket in accordance with the present invention.

Referring now to FIG. 10, an alternative bracket 120 is illustrated that is of substantially similar construction to bracket 20 discussed above, with the similar components or elements of bracket 120 being shown with similar reference numbers, but with 100 added to the reference numbers of bracket 20 of FIGS. 1-3. It should be understood that, because of the similarity of the illustrated brackets 20, 120, not all of the specific construction and alternatives of like referenced parts will be discussed in the following discussion of bracket 120.

Bracket 120 includes six mounting holes 190 disposed about base member 136. Mounting holes 190 are formed to align with fasteners 76 of fluid pump 28 (FIGS. 8 and 9) used to secure together the first and second plates 72, 74 of fluid pump 28. Bracket 120, therefore, is optionally mountable to fluid pump 28 by way of fasteners 76 such that bracket 120 and fluid pump 28 are fixedly secured together prior to positioning within pump cavity 22 of transfer case 26.

Although bracket 20 is illustrated in FIGS. 1-4 as being generally ring-shaped and including four support members 38, each of which include a tab member 50 and a single generally perpendicularly oriented wall member 54, it should be appreciated that alternative brackets may be constructed and still function as intended within the scope of the present invention. For example, a bracket may be formed to have alternatively configured bumper members, such as, for example, a rolled portion, a narrower upright member, a double-walled portion, or the like. An alternative bracket may include fewer support members and/or may include bumper members on fewer than all of the support members. As noted above, a support member may be formed to include two bumper members or wall members to surround both ends of a fluid pump lug, such as a support member formed to have a generally C-shaped configuration. Further, an alternative bracket may be formed that is positioned into a pump cavity or about a fluid pump after the fluid pump has been positioned into the pump cavity. For example, such a bracket may be disposed or positioned about the outer periphery of the flange and lugs of a fluid pump.

Although shown and described relative to a model 246GM transfer case, it should also be appreciated that bracket 20 may also be used with other transfer cases produced by or for the General Motors Corp. such as, for example, a GM model 236, 269, 136, and 261 transfer cases. Further, bracket 20 may even be used with one or more transfer cases produced by or for the Daimler-Chrysler Corp. of Detroit, Mich., or other automobile or transfer case producers. Such General Motors and Daimler-Chrysler Corp. transfer cases being manufactured by the New Venture Gear company of Troy, Mich. Still further, alternative brackets may be constructed within the scope of the present invention for use with fluid pumps and transfer case housings of other makes and models of transfer cases produced by GM, or Daimler-Chrysler, or other vehicle manufacturers. Such alternative brackets, for example, may be used with differently configured transfer case housings, pump cavities, and fluid pumps and may be generally non-circular, include more or fewer support members, or alternatively spaced support members, or support members that are disposed about or at differing angles relative to a base member.

The bracket of the present invention is adapted for installation into a pump cavity located in a housing of a transfer case such that the bracket is positioned between the housing and a fluid pump. The bracket includes support members that are positionable within indent portions of the pump cavity, with the support members adapted to receive or engage projections or lugs on the fluid pump. When so received, the fluid pump lugs of the fluid pump are inhibited by the bracket support members from contacting the housing. The bracket is thus able to inhibit wear of the transfer case housing that may otherwise occur due to relative movement of the fluid pump against the housing caused by an output shaft of the transfer case used to drive the fluid pump. The bracket, therefore, aids in preventing holes from being formed in the housing that would enable the lubrication fluid within the transfer case to leak out and result in damage to the internal components of the transfer case.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A bracket for use with a fluid pump in a transfer case of a vehicle, said bracket comprising:

a base member, said base member including an outer periphery; and a plurality of support members, said support members extending outwardly from said outer periphery of said base member, with each said support member comprising at least one wall member;

said base member being positioned within a fluid pump cavity of a transfer case housing when installed into the transfer case, where the fluid pump cavity includes a plurality of indent portions for receiving lugs extending from the fluid pump, with each said support member being disposed within a separate indent portion of the fluid pump cavity and with said wall member being positioned between the transfer case housing and a portion of a lug of the fluid pump received within the respective indent portion such that said wall members at least partially inhibit the respective lug portions from contacting the transfer case housing proximate the indent portions of the fluid pump cavity.

2. The bracket of claim 1, wherein said wall members are oriented generally perpendicularly relative to a plane defined by said base member.

3. The bracket of claim 2, wherein each said support member further comprises a tab member, with each said support member including a single wall member extending generally perpendicularly from said tab member.

4. The bracket of claim 1, wherein a respective said support member is disposed within each indent portion of the fluid pump cavity.

5. The bracket of claim 4, wherein said bracket includes four said support members.

6. The bracket of claim 1, wherein said base member is positioned on a ledge portion of the fluid pump cavity between the ledge portion and the fluid pump when said bracket is installed into the fluid pump cavity and the fluid pump is installed on top of said bracket with said base member defining a plane that is generally perpendicular to a central drive hole of the fluid pump when installed.

7. The bracket of claim 1, wherein said bracket is generally ring shaped and includes a central opening.

8. The bracket of claim 7, wherein said base member is generally planar and said base member and said central opening are coplanar.

9. A bracket in combination with a vehicle transfer case having a fluid pump comprising:

a transfer case housing, said transfer case housing including a fluid pump cavity having a plurality of indent portions;

a transfer case fluid pump, said fluid pump including a plurality of lug portions with each said lug portion being received within separate ones of said indent portions when said fluid pump is installed into said fluid pump cavity; and a bracket, said bracket including a base member and a plurality of support members extending outwardly from said outer periphery of said base member, with each said support member comprising at least one wall member;

said base member being positioned within said fluid pump cavity when installed into said transfer case housing, with each said support member being disposed within a separate one of said indent portions of said fluid pump cavity and with said wall member of each said support member being positioned between said transfer case housing and a portion of a respective one of said lugs of said fluid pump received within the respective said indent portion such that said wall members at least partially inhibit the respective said lug portions from contacting said transfer case housing proximate said indent portions of said fluid pump cavity.

10. The bracket and transfer case of claim 9, wherein said wall members are oriented generally perpendicularly relative to a plane defined by said base member.

11. The bracket and transfer case of claim 10, wherein each said support member further comprises a tab member, with each said support member including a single wall member extending generally perpendicularly from said tab member.

12. The bracket and transfer case of claim 9, wherein a respective said support member is disposed within each said indent portion of said fluid pump cavity.

13. The bracket and transfer case of claim 12, wherein said bracket includes four said support members.

14. The bracket and transfer case of claim 9, wherein said fluid pump cavity includes a ledge portion, and wherein said base member is positioned on said ledge portion between said ledge portion and said fluid pump when said bracket is installed into said fluid pump cavity and said fluid pump is installed on top of said bracket with said base member defining a plane that is generally perpendicular to a central drive hole of said fluid pump when installed.

15. The bracket and transfer case of claim 9, wherein said bracket is generally ring shaped and includes a central opening.

16. The bracket and transfer case of claim 15, wherein said base member is generally planar and said base member and said central opening are coplanar.

* * * * *